Dec. 16, 1952  E. T. HEALD  2,621,425
A/N RANGE SYSTEM SIMULATOR
Filed Jan. 4, 1951  2 SHEETS—SHEET 1

INVENTOR.
EARL T. HEALD
BY Marvin Moody
atty.

Dec. 16, 1952     E. T. HEALD     2,621,425
A/N RANGE SYSTEM SIMULATOR
Filed Jan. 4, 1951     2 SHEETS—SHEET 2

INVENTOR.
EARL T. HEALD
BY Marvin Moody
Atty.

Patented Dec. 16, 1952

2,621,425

UNITED STATES PATENT OFFICE 2,621,425

A/N RANGE SYSTEM SIMULATOR

Earl T. Heald, Pasadena, Calif., assignor to Collins Radio Company, Cedar Rapids, Iowa, a corporation of Iowa Application January 4, 1951, Serial No. 204,390

9 Claims. (Cl. 35—10.2)

This invention relates in general to apparatus for simulating the A/N range system of aerial navigation for a pilot training device.

In the training of pilots for aircraft it has generally been realized that some of the training may be given in a trainer which simulates flight conditions but which in reality is fixed to the ground. Various types of these trainers are known and generally the student pilot is placed under a hood so that he cannot see his surroundings, but sees only instruments of the trainer. The noise of a real airplane is simulated, and as far as the student is concerned, he is actually in an airplane. Some of the training in the simulator is for the purpose of familiarizing the student with the control of the airplane through the use of ailerons, rudder and elevators. He is taught to control the throttle, mixture, propeller, landing gear, flaps, and other flight controls. Thus, in some measure a student pilot may familiarize himself with the complicated instruments and control apparatus before being placed in a real aircraft. Another very important phase of the training of a pilot is to teach him to fly under instrument conditions. Under such conditions the pilot is out of visual contact with the ground and must thus rely on his radio aids and his dead reckoning for his geographic position. One of the first radio aids for aircraft navigation was the A/N range wherein a pilot flying within radio reception distance of a range station receives either an A or an N signal unless he is on one of the legs of the range station, where he receives a steady on-course signal. The presentation to the pilot might be aural or alternatively might be placed on a meter which has a needle that indicates yellow or black and has a center "on-course" position.

It is an object of this invention, therefore, to provide a simulated A/N system for a ground trainer.

A further object of this invention is to provide an A/N system for a trainer wherein the student may become familiar with the A/N system.

A feature of this invention is found in the provision for an A/N range simulator comprising an oscillator which feeds an aural input to a cam-keyed phase-reversing circuit and wherein adding means adds the output of the oscillator to the output of the phase-reversing circuit to obtain an output indicative of the trainer's position.

Further objects, features, and advantages of this invention will become apparent from the following description and claims when read in view of the drawings, in which:

Figure 1:
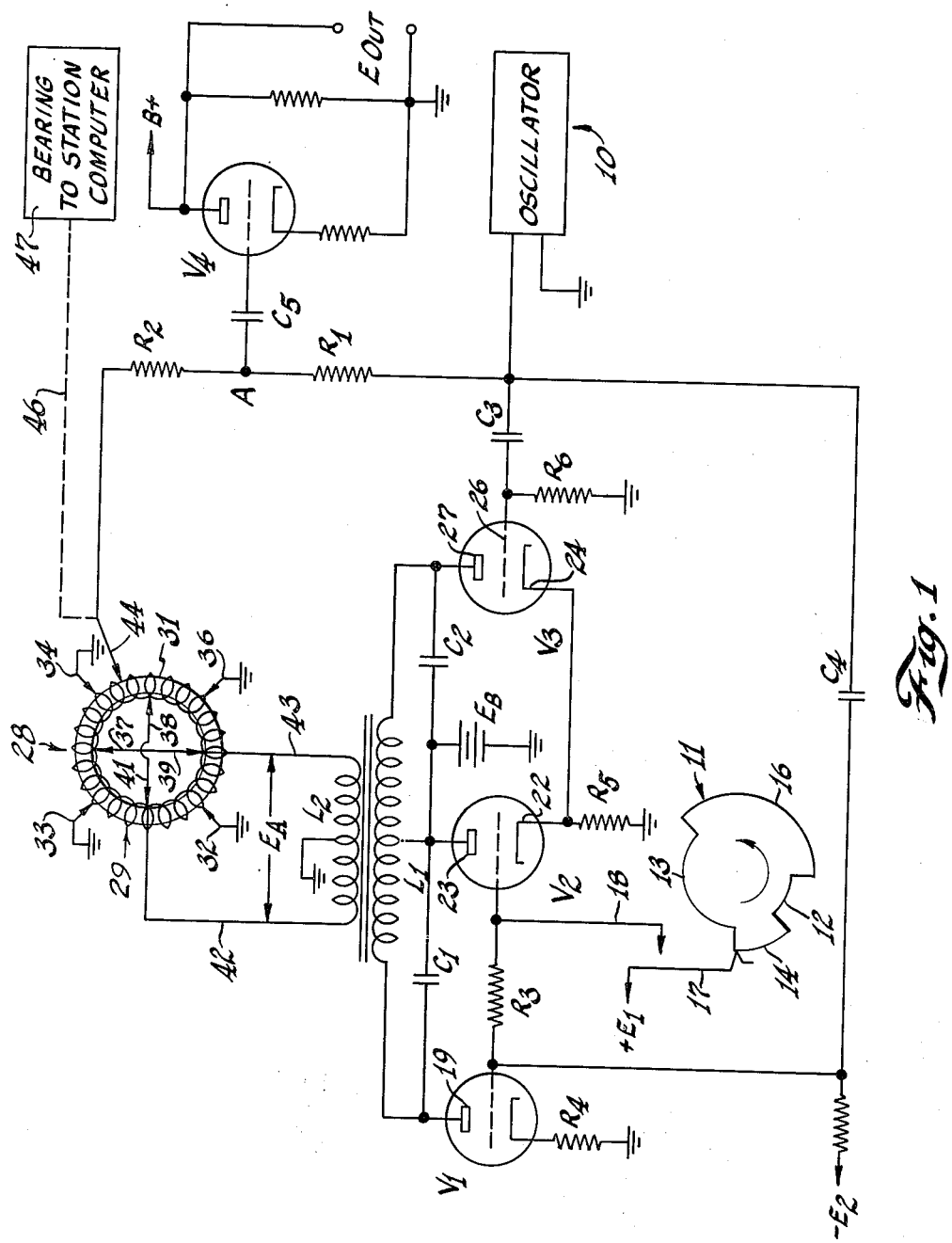
Figure 1 is a schematic diagram of the range simulator of this invention.

Figure 1 shows an oscillator 10 which produces an output which might be, for example, 1,020 cycles per second. An output of the oscillator is supplied to point A through a resistor $R_1$. A second output of the oscillator is supplied to a phase-reversing circuit whose output is fed to point A through the resistor $R_2$. The signals are added at point A and since the signals are either in phase or out of phase, respectively, the output from point A will have two distinct amplitudes with one being much larger than the other.

The phase-shifting circuit comprises a cam 11 which is mounted for rotary motion. As shown in Figure 1, the motion is counterclockwise. The cam is formed with two indentions or recesses 12 and 13 with the indention 12 being substantially smaller than the indention 13. The indentions 12 and 13 cover half of the circumference of the cam 11 thus leaving projections 14 and 16, which constitute the other half of the circumference. The projection 14 is of the same size as the recess 12, and the projection 16 is of the same size as the recess 13.

A spring loaded contact 17 engages the outer periphery of the cam 11 and is spring-biased to follow the irregularities in the surface. Thus contact 17 moves between an outer and inner position as the cam is rotated. A positive voltage $E_1$, as, for example, plus 20 volts, is electrically connected to the contact 17 and as it moves inwardly and outwardly it makes and breaks contact with a lead 18. When the contact 17 is engaged by the projections 14 and 16, the lead 18 is not connected to the plus 20 volts, and when contact 17 engages the bottom of recesses 12 and 13 the plus 20 volts is connected to lead 18. Lead 18 is connected to the grid of a tube $V_1$ through a resistor R₃. The plate 19 of tube V₁ is connected to one end of a balanced transformer which comprises an inductance L₁ connected in parallel with condensers C₁ and C₂. The cathode 21 of tube V₁ is connected to ground through the resistor R₄. The center of inductance of L₁ and the mid-point between condensers C₁ and C₂ are connected to a high voltage source E_B. The grid of V₁ is connected to E₂, which might be negative 20 volts. The tube V₁ is adjusted so that it conducts when the contact 17 supplies plus 20 volts to the lead 18 but does not conduct when the contact 17 does not engage the lead 18. Thus, the tube V₁ is triggered on and off in response to the rotation of the cam 11. A second tube V₂ has its grid connected to lead 18 and has its cathode 22 connected to ground through a resistor R₅. The plate 23 of tube V₂ is connected to the center point of L₁ and the mid point between C₁ and C₂ and to E_B. The tube V₂ conducts very heavily when the contact 17 engages the bottom of recesses 11 and 13 and conducts at a lesser rate when the contact 17 engages the projections 14 and 16, respectively.

A third tube V₃, has its cathode 24 connected to the cathode 22 of tube V₂, and its grid 26 is connected to ground through the resistor R₆ and receives a signal from the oscillator 10 through a condenser C₃. The tube V₁ also has its grid connected to the output of oscillator 10 through a condenser C₄. Tube V₃ conducts when the contact 17 is engaged by the projections 14 and 16 and is cut off when the contact 17 engages the bottoms of recesses 12 and 13. This is true because the tube V₃ is cathode-biased and the resistor R₅ causes the tube V₃ to be biased to cut off when tube V₂ draws a large amount of current. When the tube V₂ draws a smaller amount of current the voltage developed across resistor R₅ is less, and therefore the tube V₃ conducts. The plate 27 of tube V₃ is connected to the lower end of inductance L₁.

The inductance L₁ is coupled to an inductance L₂ which has its mid-point connected to ground and it is to be observed that the voltage E_A developed across the inductance L₂ reverses phase in response to rotation of cam 11. This is true because the outputs of tube V₁ and V₃ are connected to opposite ends of the transformer comprising L₁ and L₂ and as tubes V₁ and V₃ are triggered, respectively, the voltage E_A will reverse phase by 180 degrees. It is to be observed that only the alternating current components appear across the inductance L₂ and since the output of oscillator 10 is 1,020 cycles, the voltage E_A will have a frequency of 1,020 cycles. The voltage E_A is applied to a range leg selector which is shown in detail in Figure 2.

The range leg selector, designated generally as 28, comprises a circular resistor 29 which may be wound about a ring 31, for example. The resistor 29 is endless and closes upon itself. Four slide contacts designated as 32, 33, 34, and 36, respectively, are grounded and are engageable with the resistance 29. The contacts 32 through 36 determine the location of the four legs of the simulated A-N range station. For example, if the range to be simulated has "on-course" legs at 45, 135, 225 and 315 degrees, respectively, the contacts 32 through 36 are set so as to engage the resistor 29 at these points. A reference on the resistance 29 is established arbitrarily and in the example illustrated would be mid-way between the contacts 33 and 34. It is to be understood of course that the legs of an A/N course do not necessarily all fall 90 degrees apart, and therefore, contacts 32 through 36 may be set to the four legs of the system no matter where they lie.

Within the ring 31 four pivotally supported slide contacts 37, 38, 39 and 41 are mounted. The outer ends of these contacts are engageable with the resistance 29 and the alternate contacts 37 and 39, and 38 and 41, respectively, are electrically connected together. The voltage E_A across the inductance L₂ is applied across these contacts by slip rings of other suitable means. The lead 42 is connected to one side of inductance L₂ and is connected to the contacts 41 and 38 respectively, and the lead 43 is connected to the other side of inductance L₂ and is connected to the contacts 37 and 39, respectively. The contacts 37, 38, 39 and 41 are set at the mid-points between contacts 32, 33, 34 and 36. For example, if the contact 33 is set to 315 degrees and the contact 34 is set to 45 degrees, then the contact 37 will be set to zero degrees so as to fall mid-way between the two grounded contacts. Likewise, contact 38 in the above example will be set to 90 degrees, contact 39 to 180 degrees and contact 41 to 270 degrees.

It is to be understood, of course, that the contacts 37 through 41 need not necessarily be set 90 degrees apart, but their angular position is determined by the mid-points between the grounded contacts 32 through 36.

A rotatable slide contact 44 is engageable with resistance 29 and is connected to the point A through the resistor R₂. The phase and amplitude of the signal picked-off by the movable contact 44 depends upon its position about the resistor 29. For example, if it is directly opposite any of the grounded contacts 32, 33, 34 and 36, it will pick up no signal because it will be connected directly to ground. On either side of the grounded contacts a signal of 1,020 cycles will be picked up with the phase of the signal reversed on opposite sides of the grounded contact and the amplitude linearly increasing until a maximum will be reached when the contact 44 is directly in contact with the feed-in point opposite contacts 37, 38, 39 and 41.

The movable contact 44 is mechanically linked by linkage 46 to a bearing-to-station computer 47. The bearing-to-station computer includes a resolver which may contain a rho-theta computer and integrating circuits. The bearing-to-station computer may be of a variety of types and is well known to those skilled in the art. For this reason it will not be described in detail herein. For a more detailed description of such a computer, reference may be made to the patent to Agins, No. 2,467,646.

Since the bearing-to-station computer maintains the contact 44 always pointing toward the station, the signal picked up will be a function of the bearing to station.

The signal from the oscillator 10 which is fed to a point A through resistor R₁ is added to the signal picked up by the contact 44 and furnished through the condenser C₅ to the grid of an amplifying tube V₄. The output of the amplifier V₄ is presented to the student and gives an indication of his position relative to the radio station. The presentation may be made by an aural signal which is listened to by the student, or may be made on a zero center meter which reads zero when he is "on course" and right or left when he is "off course." If the contact 44 is between contacts 32 and 33, or 34 and 36, the aural output will be an A signal with the amplitude dependent upon the distance from the grounded contacts. If the contact 44 is between contacts 33 and 34 or contacts 32 and 36, an N signal will be picked up and the aural output will be an N signal.

Examples of component values are:

| | | |
|---|---|---|
| R₁ | ohms | 82,000 |
| R₂ | do | 82,000 |
| R₃ | do | 560,000 |
| R₄ | do | 1,800 |
| R₅ | do | 18,000 |
| R₆ | do | 560,000 |
| E₁ | volts positive | 20 |
| E₂ | volts negative | 20 |
| E_B | volts | 200 |

Figure 2:
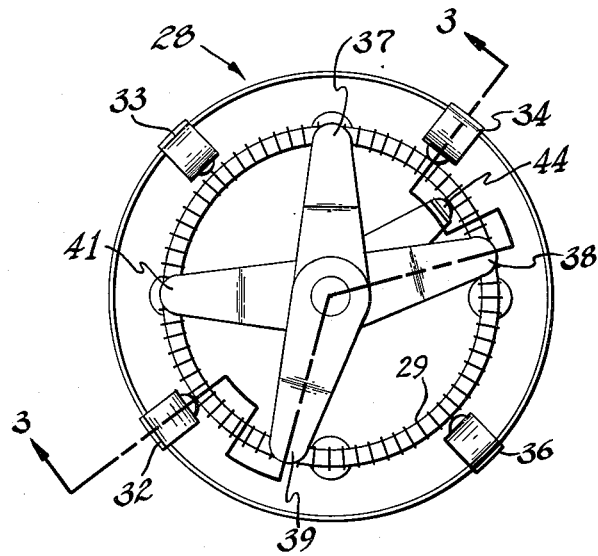
Figure 2 is a detailed top view of the range leg selector of this invention; and, Figure 3 is a sectional view taken on line 3—3 of Figure 2.
Figure 3:
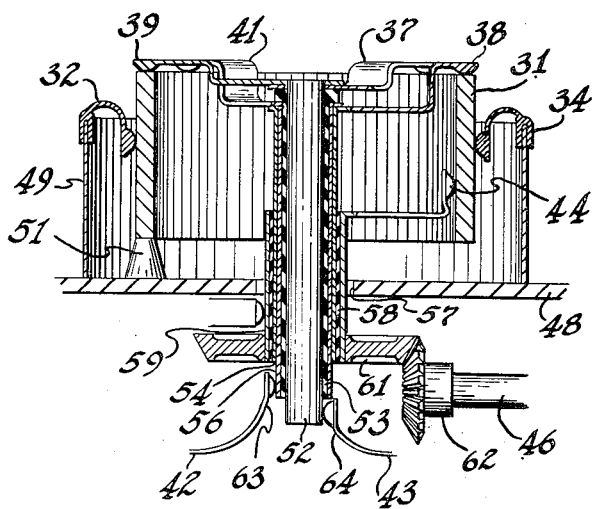

Figure 2 is a top detailed view of the range leg selector 28 and shows the contacts 32 through 44. The sectional view of Figure 3 illustrates a base member 48 to which is attached a cylindrical sleeve 49. Contacts 32, 33, 34 and 36 are slidably connected to the top of sleeve 49. The member 49 is grounded through the plate 48 and thus the contacts 32, 33, 34 and 36, respectively, are grounded. Mounted within the sleeve 49 is the ring 31. It is insulated from the sleeve 49 and base 48 by insulating standoffs 51. Contacts 37 and 39 are pivotally connected to a shaft 52 which passes axially through the ring 31 and the plate 48. The contacts 37 and 39 may be rotated relative to the shaft 52 but make electrical contact therewith. Insulating material 53 fits about the shaft 52 and insulates it from contacts 38 and 41 which are connected to cylinders 54 and 56, respectively. The cylinders 54 and 56 extend downwardly through the ring 31 and out an opening 57 formed in the plate 48. Insulating material 58 covers cylinder 56 and the contact 44 is mounted to a cylinder 59 which fits over the insulation 58. The cylinder 59 extends through the plate 48 and has mounted thereon a worm gear 61. The worm gear 61 meshes with a gear 62 which is connected to shaft 46. The shaft 46 is connected to the bearing-to-station computer 47. The lead 42 from the inductance L₂ is connected to a contact 63 which engages the cylinder 56. The lead 43 from the other side of L₂ is connected to a contact 64 which engages the center shaft 52. Thus the electrical inputs are furnished, respectively, to contacts 37 and 39, and 38 and 41. All the cylindrical members may be rotated relative to each other so that the range leg selector may be set to simulate the desired range.

It is seen that this invention provides means for simulating an A/N range and although it has been described with respect to a preferred embodiment thereof it is not to be so limited that changes and modifications may be made therein which are within the full intended scope of the invention as defined by the appended claims.

I claim:

1. An A/N radio range simulator for a pilot training device comprising, an oscillator producing an alternating signal, a phase reversing circuit receiving an output from said oscillator and reversing its phase by 180 degrees during predetermined time intervals, a range leg selector having an annularly wound resistor with four points of said resistor grounded to correspond with the geographic locations of the radio range station being simulated, a first movable contact within said range leg selector in contact with said annular resistor at the mid-point between the first and second grounded points, a second movable contact with said annular resistor at the mid-point between said second and third grounded points, a third movable contact in contact with said annular resistor at the mid-point between said third and fourth grounded points, a fourth movable contact connected to said annular resistor at the mid-point between the fourth and first grounded points, said first and third contacts connected to one side of the output of said phase reversing circuit, said second and fourth contacts engageable with the other side of the output of said phase reversing circuit, a fifth movable contact engageable with said annular resistor, a bearing-to-station computer mechanically connected to said fifth contact to move it in response to the computed bearing to station, and the output of said fifth contact added to an output of said oscillator to produce a signal indicative of the pilot trainer's orientation with respect to the A/N range.

2. In apparatus according to claim 1, a phase reversing circuit comprising, a balanced transformer, a first electronic valve with its plate connected to one end of the primary of said balanced transformer, a second electronic valve with its plate connected to the centerpoint of the primary of said balanced transformer, and a third electronic valve with its plate connected to the opposite end of the primary of said balanced transformer, an output of said oscillator connected to the grids of said first, second and third electronic valves, a cam mounted for rotary motion and formed with two projections with one of said projections being substantially larger than the other and said projections covering one half the circumference of said cam, a pawl engageable with the periphery of said cam to follow the irregularities in its surface, a switch actuated in response to movement of said pawl to connect a biasing voltage to the grids of said first and second electronic valves when the pawl is between projections on said cam, said first electronic valve conducting only when said biasing voltage is connected to its grid, said third electronic valve conducting only when the first electronic valve is not conducting, and an output voltage removed from the secondary of said balanced transformer which reverses in phase by 180 degrees as said biasing voltage is connected and disconnected, respectively, to said grids.

3. In a synthetic A/N range system a phase reversing circuit receiving an output from an oscillator and comprising, a transformer, a first electronic valve with its plate connected to one end of the primary of said transformer, a second electronic valve with its plate connected to the mid-point of the primary of said transformer, and a third electronic valve with its plate connected to the opposite end of the primary of said transformer, an output from said oscillator furnished to the grids of said first, second, and third electronic valves, a cam supported for rotary motion and formed with two projections with one of the projections substantially larger than the other and said projections comprising one-half the periphery of said cam, a cam follower engageable with the periphery of said cam and following the irregularities in its periphery, said cam follower connecting a positive biasing voltage to the grids of said first and second electronic valves when engaged with the low points of said cam, said first electronic valve conducting when its grid is connected to said biasing voltage and not conducting when its grid is not connected to said biasing voltage, the cathode of said third electronic valve connected to the cathode of said second electronic valve and biased to cut off when said biasing voltage is furnished to the grids of said first and second electronic valves and conducting when said biasing voltage is not connected to said first and second grid, and the output voltage across the secondary of said transformer reversing in phase by 180 degrees in response to rotation of the cam.

4. In a synthetic A/N range device for a pilot training apparatus, a phase reversing circuit comprising, a transformer with one end of its primary connected to the plate of a first electronic valve, the mid-point of its primary connected to the plate of a second electronic valve, and the opposite end of its primary connected to the plate of a third electronic valve, a cam supported for rotary motion and formed with two projections which cover one-half the periphery of the cam and with one of said projections being substantially larger than the other one, a cam follower engageable with the periphery of said cam, a biasing voltage connected and disconnected respectively to the grids of said first and second electronic valve in response to motion of the cam follower, said first electronic valve biased to cut-off when said cam follower engages said projections, and biased to conduction when said cam follower engages the recesses between projections, said third electronic valve biased to cut-off when said cam follower engages the recesses between projections, and said third electronic valve biased to conduction when the cam follower engages said projections, and the output of the secondary of said transformer reverses in phase by 180 degrees in response to rotation of said cam.

5. In an A/N range simulator for a pilot training device, a range leg selector comprising, an annular member, a resistor wound transversely about said annular member and its ends connected together so as to form an endless resistor, a first set of four slidable contacts engageable with said resistor and set to correspond with the legs of the A/N range being simulated, a second set of four slidable contacts engageable with said resistor and set to the mid points between the first set of contacts, and alternate contacts of said second set of contacts connected electrically together, a take-off contact supported for rotary motion, engageable with said resistor and insulated from said first and second set of contacts and removing an output from said resistor whose phase and amplitude is dependent upon its annular position relative to the resistor.

6. In an A/N range for a pilot training device having an oscillator, a phase reversing circuit, a range leg selector comprising an annular resistor, four grounded contacts engageable with said resistor and set to correspond, respectively, to the legs of the A/N range being simulated, four slidable contacts engageable with said resistor and set, respectively, to the mid-points between said grounded contacts and alternate slidable contacts connected together electrically, said slidable contacts receiving the output of said phase reversing circuit, a take-off contact engageable with said resistor and removing an output therefrom indicative of the pilot trainer's orientation with respect to the simulated station, and a bearing-to-station computer mechanically connected to said take-off contact and moving it to always point toward the simulated station.

7. In a simulated A/N range system for a pilot training device having an oscillator and a phase reversing circuit receiving an output from said oscillator, a range leg selector comprising, a first hollow cylindrical member, a resistor wound longitudinally about said first cylindrical member with the ends connected together so as to form an endless resistor, a second cylindrical member supported about said first cylindrical member, a plurality of slide contacts slidably connected to the upper end of said cylindrical member and engageable with said resistor, a first pair of wiper blades engageable with said resistor, a shaft rotatably connected to the end of said first pair of wiper blades, a second pair of wiper blades engageable with said resistor and insulated from the first pair of wiper blades and rotatably connected to a hollow shaft which is concentric about said first shaft, an output wiper blade mounted to a third shaft which is concentric with the first and second shafts and insulated therefrom, driving means mechanically connected to said third shaft and comprising a bearing-to-station computer, and an input from said phase reversing circuit connected across the first and second shafts.

8. A synthetic A/N range for a pilot training device comprising, an oscillator, first, second, and third electronic valves receiving an output on their grids from said oscillator, a transformer with one end of its primary connected to the plate of the first electronic valve, the opposite end of the primary connected to the plate of the third electronic valve and the mid-point of said primary connected to the plate of the second electronic valve, a cam supported for rotary motion, a biasing voltage controlled by said cam and triggering said first and third electronic valves so that when one is conducting the other is cut-off, a range leg selector comprising an annular resistor, a first pair of slide contacts connected electrically together and engageable with said resistor and receiving one side of the output voltage of said phase reversing circuit, a second pair of slide contacts connected electrically together and engageable with said resistor and receiving the other side of the output of said phase reversing circuit, four grounded contacts engageable with said resistor at the mid-points between the first and second pairs of slide contacts, an output contact slidably connected to said resistor, a bearing-to-station computer mechanically connected to said output contact, and the output of said output contact added to an output of said oscillator to produce a signal indicative of the orientation of said pilot training device relative to the synthetic radio range.

9. A synthetic A/N range for a pilot training device comprising, an oscillator, a phase reversing circuit receiving an output of said oscillator and reversing it periodically in response to a cam supported for rotary motion and formed with a pair of projections which cover one-half the periphery of said cam and with one of said projections being substantially larger than the other, a range leg selector comprising an annular resistor, first, second, third, and fourth grounded contacts engageable with said resistor and set to the annular positions of the on-course legs of said range station, a first pair of feed-in contacts receiving one side of the output of said phase reversing circuit and feeding it to said resistor at the mid-points between the first and second, and third and fourth grounded contacts, respectively, a second pair of feed-in contacts receiving the other side of the output of said phase reversing circuit and feeding it to the mid-points between the second and third and first and fourth grounded contacts, respectively, a bearing-to-station computer, an output contact engageable with said resistor and movable relative thereto and mechanically linked to said bearing-to-station computer, and adding means receiving an output from said oscillator and the output from said output contact to add them and obtain a signal indicative of the trainer's position relative to the range station.

EARL T. HEALD.

REFERENCES CITED

The following references are of record in the file of this patent:

UNITED STATES PATENTS

| Number | Name | Date |
|---|---|---|
| 2,359,294 | Blenman | Oct. 3, 1944 |
| 2,438,126 | Muller | Mar. 23, 1948 |
| 2,460,511 | Lang | Feb. 1, 1949 |
| 2,463,583 | White | Mar. 8, 1949 |
| 2,476,316 | Muller | July 19, 1949 |
| 2,536,474 | Susdorf | Jan. 2, 1951 |